(12) United States Patent
Masuichi et al.

(10) Patent No.: US 7,844,598 B2
(45) Date of Patent: Nov. 30, 2010

(54) QUESTION ANSWERING SYSTEM, DATA SEARCH METHOD, AND COMPUTER PROGRAM

(75) Inventors: Hiroshi Masuichi, Kanagawa (JP); Tomoko Ohkuma, Kanagawa (JP); Hiroki Yoshimura, Kanagawa (JP); Daigo Sugihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 810 days.

(21) Appl. No.: 11/231,845

(22) Filed: Sep. 22, 2005

(65) Prior Publication Data

US 2006/0204945 A1 Sep. 14, 2006

(30) Foreign Application Priority Data

Mar. 14, 2005 (JP) ............................. 2005-070541

(51) Int. Cl.
G06F 7/00 (2006.01)
G06F 17/30 (2006.01)
(52) U.S. Cl. ......................................... 707/713; 705/10
(58) Field of Classification Search .................. 707/713
See application file for complete search history.

(56) References Cited

U.S. PATENT DOCUMENTS

| | | | | |
|---|---|---|---|---|
| 4,658,370 A | * | 4/1987 | Erman et al. | 706/60 |
| 4,860,214 A | * | 8/1989 | Matsuda et al. | 706/52 |
| 5,295,836 A | * | 3/1994 | Ryu et al. | 434/335 |
| 5,317,725 A | * | 5/1994 | Smith et al. | 714/27 |
| 5,377,196 A | * | 12/1994 | Godlew et al. | 714/712 |
| 5,519,608 A | | 5/1996 | Kupiec | |
| 6,126,306 A | * | 10/2000 | Ando | 708/605 |
| 6,131,085 A | * | 10/2000 | Rossides | 705/1 |
| 6,236,968 B1 | * | 5/2001 | Kanevsky et al. | 704/275 |
| 2003/0125997 A1 | * | 7/2003 | Stoltz | 705/7 |
| 2003/0158723 A1 | | 8/2003 | Masuichi et al. | |
| 2003/0172374 A1 | * | 9/2003 | Vinson et al. | 725/9 |
| 2004/0117352 A1 | * | 6/2004 | Schabes et al. | 707/3 |
| 2004/0158406 A1 | * | 8/2004 | Harrison | 702/13 |
| 2004/0259062 A1 | * | 12/2004 | Heller et al. | 434/236 |

(Continued)

FOREIGN PATENT DOCUMENTS

JP A-61-221873 10/1986

(Continued)

OTHER PUBLICATIONS

"Strategies for Advanced Question Answering", authors Sanda Harabagiu and Fineley Lacatusu, Mar. 24, 2004, nine pages.*

(Continued)

*Primary Examiner*—Neveen Abel Jalil
*Assistant Examiner*—Tarek Chbouki
(74) *Attorney, Agent, or Firm*—Oliff & Berridge, PLC (57) ABSTRACT

A question answering system includes a question dividing unit, a question answering unit, and an answer determination unit. The question dividing unit applies a predetermined question dividing rule to an input question, to divide the input question into sub-questions. The question answering unit acquires answer candidates corresponding to the sub-questions generated by the question dividing unit, together with certainty values serving as reliability indexes. The answer determination unit selects an answer to the input question from among the answer candidates acquired by the question answering unit.

14 Claims, 9 Drawing Sheets

U.S. PATENT DOCUMENTS

| | | | |
|---|---|---|---|
| 2005/0060301 A1* | 3/2005 | Seki et al. ............... | 707/3 |
| 2005/0221265 A1* | 10/2005 | Tashiro et al. ............. | 434/322 |
| 2005/0266387 A1* | 12/2005 | Rossides ................. | 434/323 |
| 2006/0194182 A1* | 8/2006 | Anand .................... | 434/322 |
| 2007/0016401 A1* | 1/2007 | Ehsani et al. ............. | 704/9 |
| 2007/0067293 A1* | 3/2007 | Yu ........................ | 707/7 |
| 2007/0172809 A1* | 7/2007 | Gupta .................... | 434/350 |
| 2008/0162393 A1* | 7/2008 | Iliff ...................... | 706/46 |

FOREIGN PATENT DOCUMENTS

| | | |
|---|---|---|
| JP | A-03-005883 | 1/1991 |
| JP | A-07-056954 | 3/1995 |
| JP | A 2002-132811 | 5/2002 |
| JP | A 2005-165416 | 6/2005 |

OTHER PUBLICATIONS

Authors: Jennifer Chu-Carroll, John Prager, Christopher Welty, Krzysztof Czuba and David Ferrucci, tilte: "A Multi-Strategy and Multi-Source Approach to Question Answering", dated Feb. 6, 2003, pp. 1-8.*

JimmyLin and Boris Katz, "Question Answering from the Web Using Knowledge Annotation and Knowledge Mining Techniques", Nov. 2003.*

U.S. Appl. No. 11/231,947, Hiroshi Masuichi et al., filed Sep. 22, 2005.

U.S. Appl. No. 11/232,379, Tomoko Ohkuma et al., filed Sep. 22, 2005.

Lin et al., "Question Answering Techniques for the World Wide Web," Tutorial Presentation at the 11th Conference of the European Chapter of the Association of Computational Linguistics, Apr. 12, 2003.

Katz et al., "Omnibase: Uniform Access to Heterogeneous Data for Question Answering," Proceedings of the 7th International Workshop on Applications of Natural Language to Information Systems, pp. 1-5, 2002.

Masuichi et al., "Constructing a practical Japanese Parser based on Lexical Functional Grammar," Natural Language processing, vol. 10, No. 2, pp. 79-109, Apr. 2003 with English-language abstract.

Masuichi et al., "Japanese Parser on the basis of the Lexical-Functional Grammar Formalism and its Evaluation," Proceedings of the 17th Pacific Asia Conference on Language, Information and Computation, PACLIC17, pp. 298-309, Oct. 2003.

Kay, "Chart Generation," 34th Annual Meeting of the Association for Computational Linguistics, pp. 200-204, Jun. 1996.

Jul. 27, 2010 Office Action issued in Japanese Patent Arplication No. 2005-070541 (with translation).

Harabagiu et al., "Strategies for Advanced Question Answering," Proc. of the Workshop on Pragmatics of Question Answering at HLT-NAACL 2004, Mar. 24, 2004, pp. 1-9, [online] http://acl.1dc.upenn.edu/hit-naac12004/qu/index.html.

* cited by examiner

| MODIFIER | MODIFIEE | MODIFICATION RELATION |
|---|---|---|
| YOMIURI LAND | LOCATED | LOCATION |
| LOCATED | ROLLER COASTER | ADJUNCT |
| WOODEN | ROLLER COASTER | ADJUNCT |
| ROLLER COASTER | COPULA | SUBJECT |
| INTERROGATE PRONOUN | COPULA | COMPLEMENT |

| | CERTAINTY VALUE OF ANSWER TO PARTIAL QUESTION A | CERTAINTY VALUE OF ANSWER TO PARTIAL QUESTION B | SUM OF CERTAINTY VALUES |
|---|---|---|---|
| BANDIT | 0.95 | 0.00 | 0.95 |
| WHITE CANYON | 0.95 | 0.90 | 1.85 |
| ELF | 0.21 | 0.90 | 1.11 |
| ASKA | 0.00 | 0.90 | 0.90 |
| JUPITER | 0.00 | 0.90 | 0.90 |
| REGINA | 0.00 | 0.90 | 0.90 |
| WHITE CYCLON | 0.00 | 0.90 | 0.90 |

QUESTION ANSWERING SYSTEM, DATA SEARCH METHOD, AND COMPUTER PROGRAM

BACKGROUND OF THE INVENTION

1. Field of the Invention

This invention relates to a question answering system, a data search method, and a computer program, and more particularly to a question answering system, a data search method, and a computer program for making it possible to provide a precise answer by dividing a question sentence into sub-questions, searching for answer candidates based on the sub-questions, and selecting the final answer from among the found answer candidates.

2. Description of the Related Art

Recently, network communications through the Internet, etc., have grown in use and various services have been provided through the network. One of the services through the network is search service. In the search service, for example, a search server receives a search request from a user terminal such as a personal computer or a mobile terminal connected to the network, executes a process responsive to the search request, and transmits the process result to the user terminal.

For example, to execute a search process through the Internet, a user accesses a Web site providing search service, enters search conditions such as a keyword, a category, etc., in accordance with a menu presented by the Web site, and transmits the search conditions to a server. The server executes a process in accordance with the search conditions and displays the process result on the user terminal.

A data search process is implemented by various modes. For example, a keyword-based search system in which the user enters a keyword and list information of documents containing the entered keyword is presented to the user; a question answering system in which the user enters a question sentence and an answer to the question is provided; and the like are available. The question answering system is a system in which the user needn't select a keyword and can receive only the answer to the question; it is widely used.

For example, JP 2002-132811 A discloses a typical question answering system. JP 2002-132811 A discloses a configuration for determining a search-word set and a question type from a question sentence, searching a document set stored in a document-set storage unit for a relevant-document set in accordance with the determined search-word set and the question type, extracting an answer to the question sentence from relevant documents, and providing the extracted answer and document information from which the answer is extracted as an answering result to the question sentence.

In a general question answering system, the question sentence provided by the user is input and the answer to the question sentence is output without outputting the whole hit document. Often, web information is used as a knowledge source to obtain an answer. Under the present circumstances, however, it is difficult to say that the question answering system has sufficient answering accuracy, and the question answering system is less widespread than a general keyword-based search system.

In the current typical question answering system, a process is executed according to the following procedure: First, content words (phrases) are extracted from a question sentence, the obtained content words are used as search words to search the knowledge sources (e.g., Web pages) for an answer to the question, and an answer is extracted from the search result. For example, if the question is "How many hours is the time difference between Japan and Brazil?", "Japan," "Brazil," and "time difference" are extracted as the content words (phrases) and are used as search words (phrases) to make a search. "How many hours" is usually used for the search because an interrogative pronoun is contained. As the search is made, text such that "The time difference between Japan and Brazil is 12 hours" is obtained from the knowledge sources, and it is made possible to extract "12 hours" as an answer. The search technique in question answering is described in "NTT's Question Answering System for NTCIR QAC2" (H. Isozaki, Working Notes of NTCIR-4 Workshop, pp. 326-332, (2004)).

In the technique described above, however, if the question sentence is long and complicated, a search is made with giving a high priority to the search result containing as many content words in the question sentence as possible. Therefore, an appropriate search result cannot be obtained; this is a problem.

For example, if the question is

"What is the wooden roller coaster located in YOMIURI Land?" (the right answer is "White Canyon"), (*it is noted that "YOMIURI Land" is the name of an amusement park located in Tokyo, Japan.)

"YOMIURI Land," "wooden," and "roller coaster" are obtained as search words, and a search process, which gives high priority to the search result containing as many search words as possible, is executed.

Therefore, if the descriptions

"White canyon is a roller-coaster located in YOMIURI Land", and

"White canyon is a wooden roller coaster"

exist in different locations of the knowledge sources, the following description accidentally containing all search words "Bandit located in YOMIURI Land resembles Elf in HIRAKATA Park, a wooden roller coaster"

(It is noted that "HIRAKATA Park" is the name of an amusement park located in Osaka, Japan.)

is retrieved preferentially, and consequently an erroneous answer of "Bandit" or "Elf" is extracted.

Thus, in the question answering system disclosed in the above publication and document, generally if the question sentence is long, the possibility that an appropriate description containing all content words existing in the question sentence may exist in the knowledge sources becomes extremely low. Further, as a result thereof, the possibility that an erroneous answer may be extracted becomes high; this is a problem.

SUMMARY OF THE INVENTION

The invention provides a question answering system, a data search method, and a computer program for making it possible to extract an exact answer if a question sentence is long.

According to one embodiment of the invention, a question answering system includes a question answering unit, and an answer determination unit. The question dividing unit applies a predetermined question dividing rule to an input question, to divide the input question into sub-questions. The question answering unit acquires answer candidates corresponding to the sub-questions generated by the question dividing unit, together with certainty values serving as reliability indexes. The answer determination unit selects an answer to the input question from among the answer candidates acquired by the question answering unit.

According to another embodiment of the invention, a data search method includes applying a predetermined question dividing rule to an input question, to divide the input question into sub-questions; acquiring answer candidates corresponding to the sub-questions generated by the question dividing unit, together with certainty values serving as reliability indexes; and selecting an answer to the input question from among the answer candidates acquired by the question answering unit.

According to still another embodiment of the invention, a computer program is stored in a computer readable medium. The computer program causes a computer to execute a data search process including applying a predetermined question dividing rule to an input question, to divide the input question into sub-questions; acquiring answer candidates corresponding to the sub-questions generated by the question dividing unit, together with certainty values serving as reliability indexes; and selecting an answer to the input question from among the answer candidates acquired by the question answering unit.

The computer program according to the embodiments of the invention can be provided by a record medium or a communication medium for providing the computer program for a computer system that can execute various program codes in a computer-readable format. For example, examples of the record medium include a CD, an FD, or an MO. Examples of the communication medium include a network. Such a program is provided in the computer-readable format, whereby a process responsive to the program is realized in a computer system.

Another object of the invention, features of the invention, and advantages of the invention will be revealed in the detailed description based on embodiments of the invention and the accompanying drawings. The system in the specification is a logical set made up of a plurality of units (apparatus) and is not limited to a set of units (apparatus) housed in a single casing.

According to the above-described configuration, even if the input question is a long sentence, it is possible to provide an optimum answer.

BRIEF DESCRIPTION OF THE DRAWINGS

Embodiment of the invention will be described in detail based on the following figures, wherein.

DETAILED DESCRIPTION OF THE EMBODIMENTS OF THE INVENTION

A question answering system, a data search method, and a computer program according to an embodiment of the invention will be discussed in detail with reference to the accompanying drawings.

Figure 1:
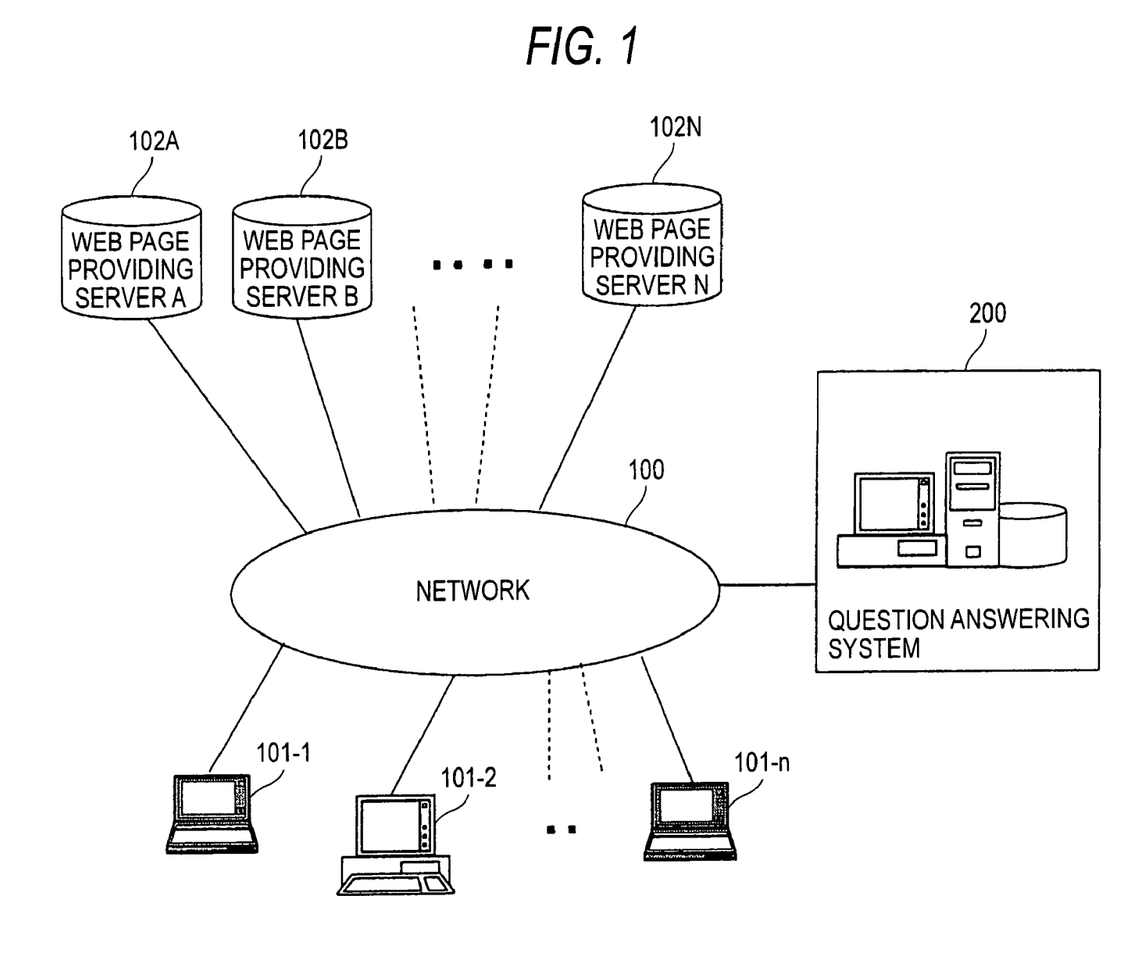
FIG. 1 is a drawing of the network configuration to show an application example of a question answering system of the invention.

To begin with, an example of the usage pattern of the question answering system of the embodiment of the invention will be discussed with reference to FIG. 1. FIG. 1 is a drawing showing the network configuration in which a question answering system 200 of the embodiment of the invention is connected to a network. A network 100 shown in FIG. 1 is, for example, the Internet, an intranet, etc. Connected to the network 100 are clients 101-1 to 101-$n$ serving as user terminals for transmitting a question to the question answering system 200 and various Web-page providing servers 102A to 102N for providing Web pages serving as materials to acquire answers to the clients 101-1 to 101-$n$.

The question answering system 200 is input various question sentences generated by the users from the clients 101-1 to 101-$n$ and provides the answers to the input questions for the clients 101-1 to 101-$n$. The answers to the questions are acquired from the Web pages provided by the Web-page providing servers 102A to 102N.

The Web-page providing servers 102A to 102N provide Web pages as pages opened to the public by a WWW (World Wide Web) system. The Web page is a data set to be displayed on a Web browser and is made up of text data, HTML layout information, an image, audio, a moving image, etc., embedded in a document. A set of Web pages is a Web site, which includes a top page (home page) and other Web pages linked from the top page.

The configuration and process of the question answering system 200 will be discussed with reference to FIG. 2. The question answering system 200 is connected to the network 100 and executes process of receiving an answer from a client connected to the network 100, searching for an answer the Web pages provided by the Web-page providing server connected to the network 100 as the information source, and providing the answer for the client.

Figure 2:
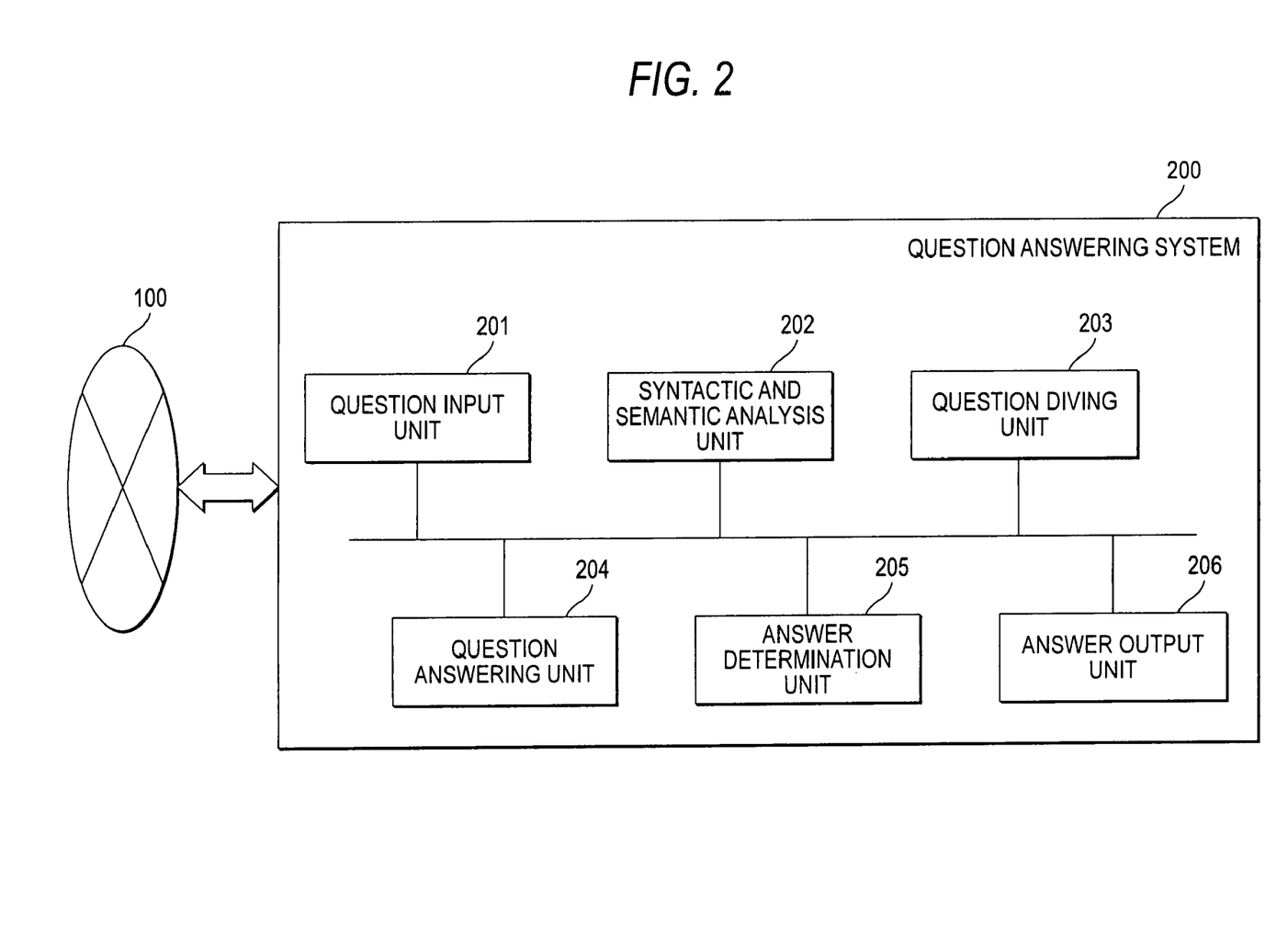
FIG. 2 is a block diagram to describe the configuration of the question answering system according to one embodiment of the invention.

The question answering system 200 has a question input unit 201, a syntactic and semantic analysis unit 202, a question dividing unit 203, a question answering unit 204, an answer determination unit 205, and an answer output unit 206, as shown in FIG. 2.

Processes executed by the question input unit 201, the syntactic and semantic analysis unit 202, the question dividing unit 203, the question answering unit 204, the answer determination unit 205, and the answer output unit 206 in the question answering system 200 will be discussed below.

[Question Input Unit]

The question input unit 201 inputs a question sentence (input question) from a client through the network 100. Assuming that the following question is input from a client as a specific question example, (Input Question)

"What is the wooden roller coaster located in YOMIURI Land?", the process of each unit in the question answering system 200 will be discussed.

[Syntactic and Semantic Analysis Unit]

The syntactic and semantic analysis unit 202 executes a syntactic and semantic analysis process on an input question. First, the syntactic and semantic analysis process will be discussed. Natural languages described in various languages including Japanese and English essentially have abstract and highly ambiguous nature, but can be subjected to computer process as sentences are handled mathematically. Consequently, various applications and services concerning natural languages can be provided by automation process, such as machine translation, an interactive system, a search system, and a question answering system. The natural language process generally is divided into process phases of morphological analysis, syntactic analysis, semantic analysis, and context analysis.

In the morphological analysis, a sentence is divided into morphemes of minimal meaning units and a process of identifying part of speech is performed. In the syntactic analysis, a sentence structure such as a phrase structure is analyzed based on the grammar laws. Since the grammar laws are of a tree structure, the syntactic analysis result generally becomes a tree structure where the morphemes are joined based on the modification relation. In the semantic analysis, obtained is a semantic structure representing the meaning of a sentence on the basis of the meaning of the words in the sentence (notion), the semantic relation between the words, etc, to synthesize a semantic structure. In the context analysis, text of a series of sentences (discourse) is assumed to be the basic unit of analysis, the semantic (meaningful) unit between the sentences is obtained, and a discourse structure is formed.

It is said that the syntactic analysis and the semantic analysis are absolutely necessary arts to realize applications of an interactive system, machine translation, document proofreading support, document abstract, etc., in the field of natural language process.

In the syntactic analysis, a natural language sentence is received and a process of determining the modification relation between the words (segments) is performed based on the grammar laws. The syntactic analysis result can be represented in the form of a true structure called dependency structure (dependency tree). In the semantic analysis, a process of determining the case relation in a sentence can be performed based on the modification relation between the words (segments). The expression "case relation" mentioned here refers to the grammar role such as subject (SUBJ) or object (OBJ) that each of the elements making up a sentence has. The semantic analysis may contain a process of determining the sentence tense, aspect, narration, etc.

As for an example of a syntactic and semantic analysis system, a natural language process system based on LFG is described in detail in "Developing practical Japanese-language analyzing system based on Lexical Functional Grammar" (Masuichi and Ohkuma, natural language processing, Vol. 10. No. 2, pp. 79-109 (2003)) and "Japanese Parser on the basis of the Lexical-Functional Grammar Formalism and its Evaluation" (Hiroshi Masuichi, et al., In Proceedings of The 17th Pacific Asia Conference on Language, Information and Computation (PACLIC17), pp. 298-309 (2003) ). Also, the entire contents of U.S. patent application Ser. No. 10/368,445 (which has been published as U.S. Pat. No. 2003/158723 A) are incorporated herein by reference. For example, the natural language process system based on LFG can be used as the syntactic and semantic analysis unit 202 in the question answering system according to this embodiment of the invention.

Figure 3:
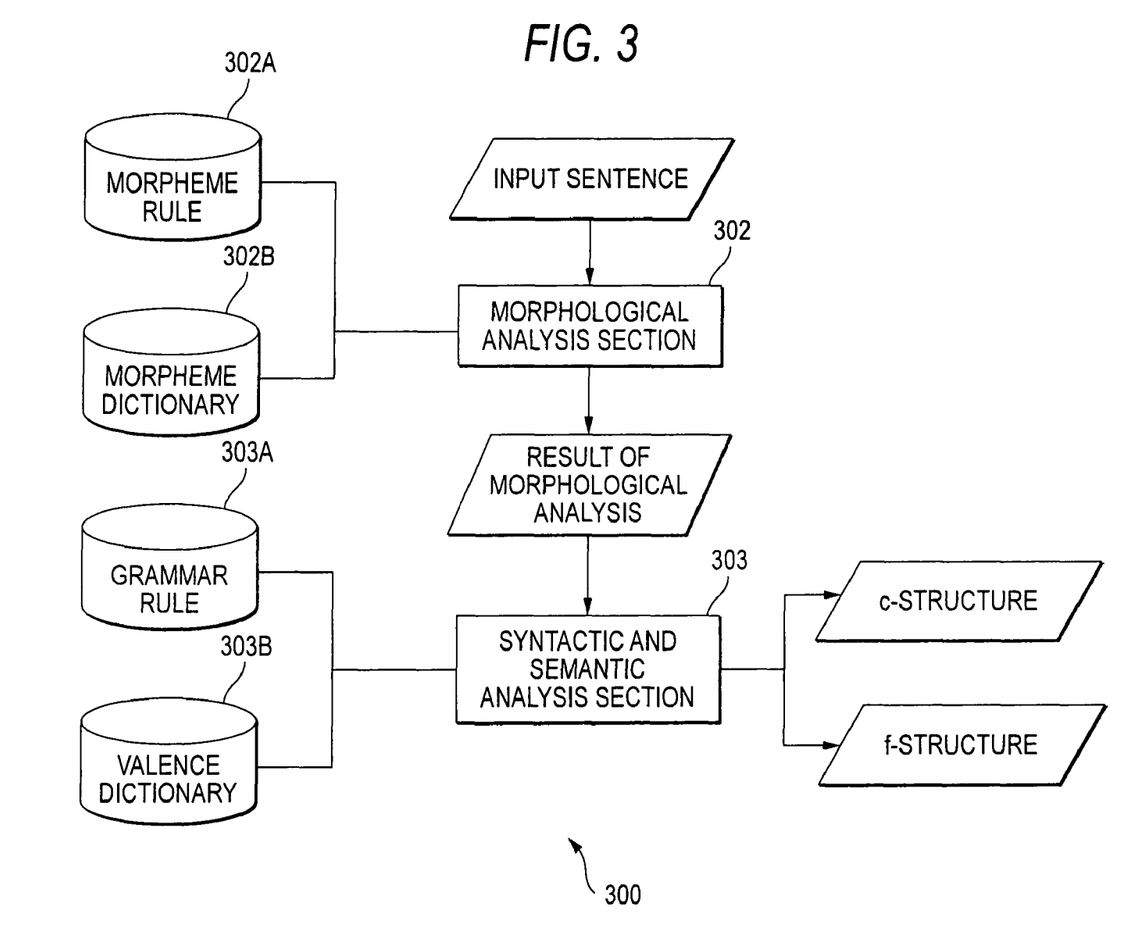
FIG. 3 is a diagram to describe a configuration example of syntactic and semantic analysis unit in the question answering system according to the embodiment of the invention.

FIG. 3 shows the configuration of a syntactic and semantic analysis system 300 based on Lexical Functional Grammar (LFG). A morphological analysis section 302 has a morpheme rule 302A and a morpheme dictionary 302B relating to a specific language such as Japanese. The morphological analysis section 302 divides an input sentence into morphemes of minimal meaning units and performs the process of identifying part of speech.

Then, the morphological analysis result is input to a syntactic and semantic analysis section 303. The syntactic and semantic analysis section 303 has dictionaries such as a grammar rule 303A and a valence dictionary 303B. The syntactic and semantic analysis section 303 analyzes the phrase structure based on the grammar rule, etc., and analyzes the semantic structure representing the meaning of a sentence based on the meaning of the words in the sentence, the semantic relation between the words, etc., (the valence dictionary describes the relation with any other component in the sentence such as a verb and a subject, and the semantic relation between a predicate and its dependent word can be extracted). Then, the syntactic and semantic analysis section 303 outputs "c-structure (constituent structure)" representing the phrase structure of the sentence made up of words, morphemes, etc., as a tree structure as the syntactic analysis result. Also, the syntactic and semantic analysis section 303 outputs "f-structure (functional structure)" as a result of semantically and functionally analyzing the input sentence as an interrogative sentence, past form, a polite sentence, etc., based on the case structure of a subject, an object, etc.

That is, c-structure represents the structure of a natural language sentence as a tree structure by collecting the morphemes of the sentence into an upper phrase, and f-structure represents semantic information of the case structure, sentence tense, aspect, narration, etc., of a sentence as an attribute-attribute value matrix structure based on the notion of the grammar function.

For example, it is assumed that the input question from a client is (Input Question)

"What is the wooden roller coaster located in YOMIURI Land?".

Figure 4:
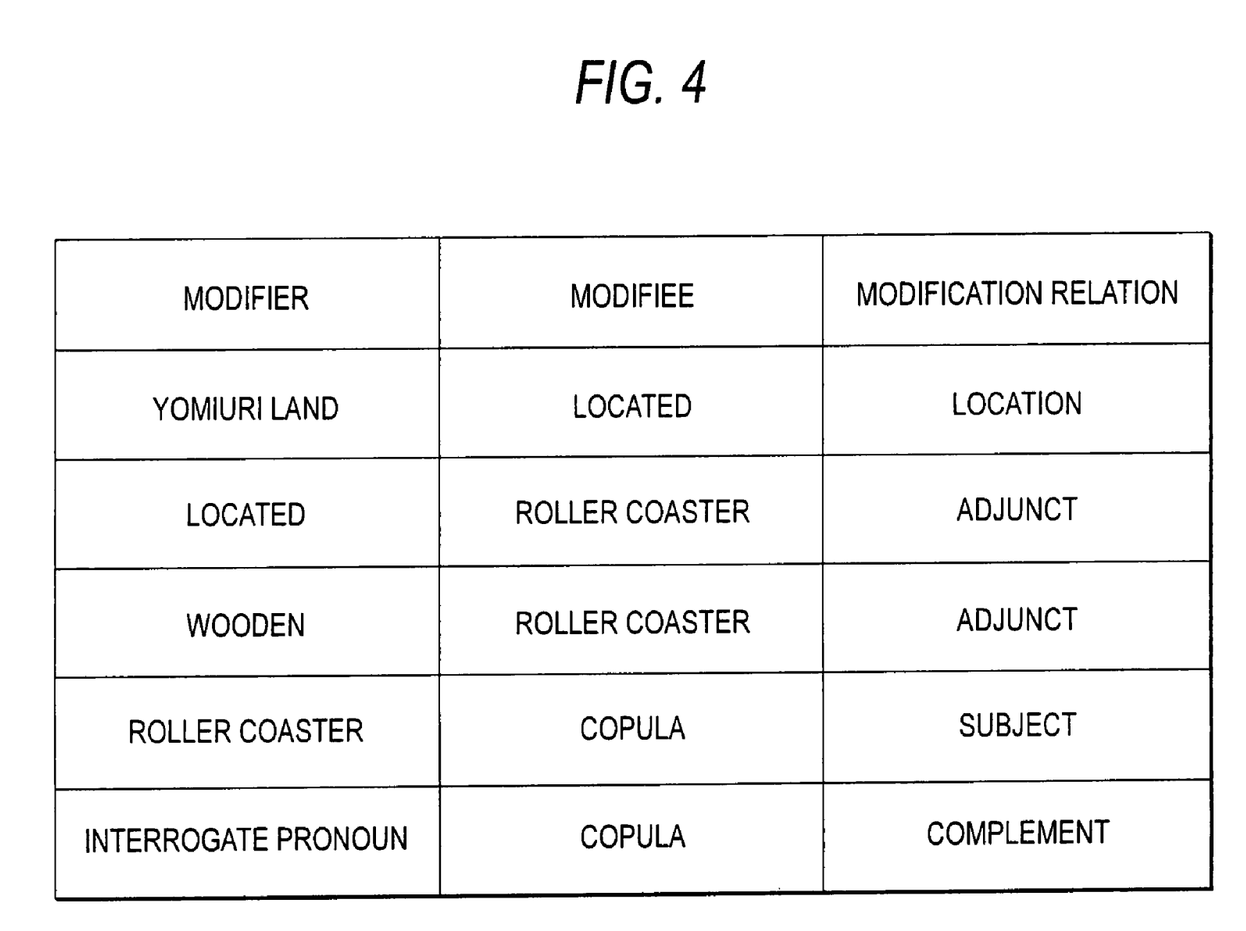
FIG. 4 is a drawing to show a data example of the result of the syntactic and semantic analysis generated as the syntactic and semantic analysis unit performs process.
Figure 5:
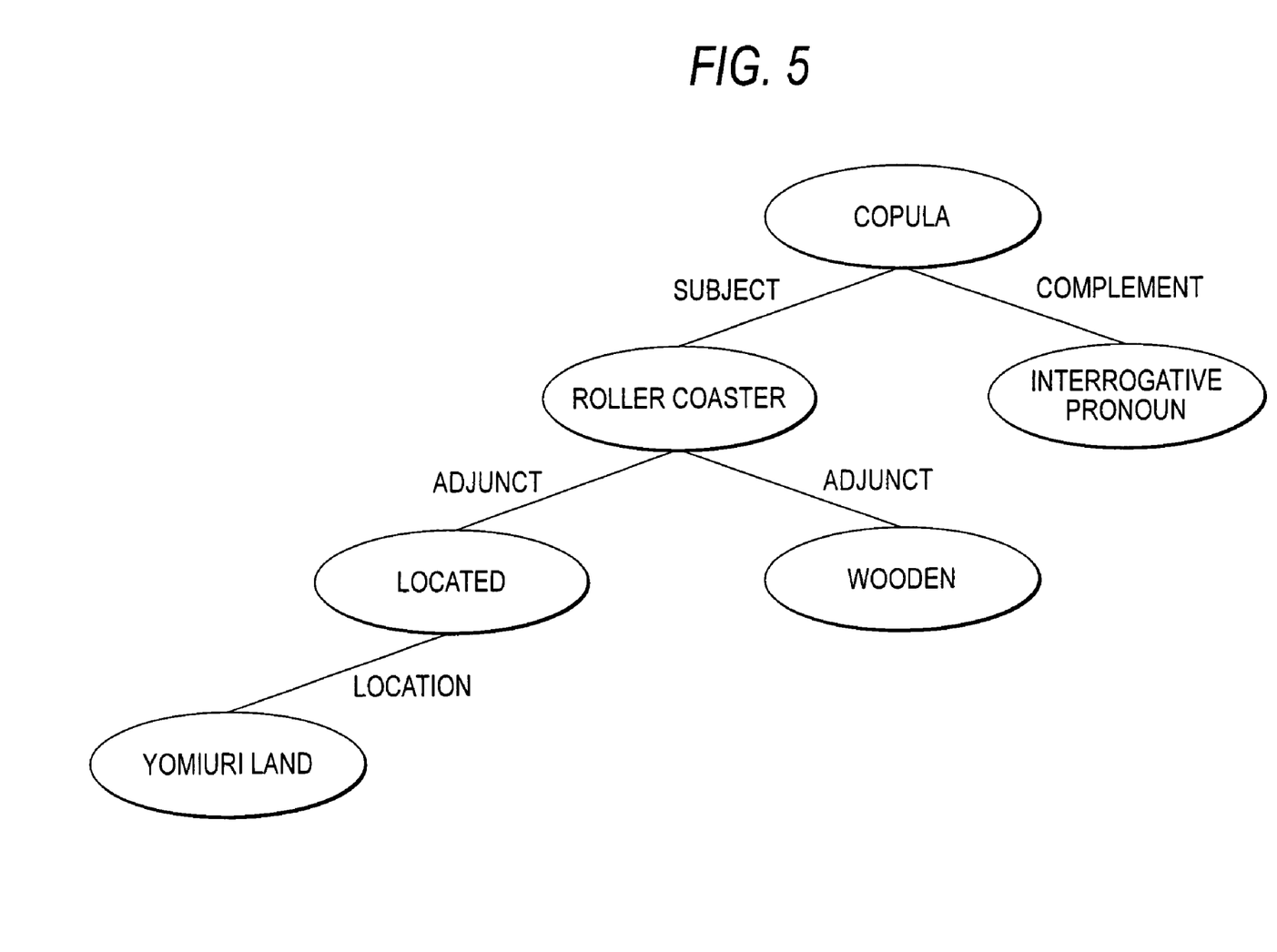
FIG. 5 is a drawing to show as a tree structure a data example of the result of the syntactic and semantic analysis generated as the syntactic and semantic analysis unit performs process.

FIG. 4 shows a result of the syntactic and semantic analysis process. FIG. 4 provides data indicating a modifier, a modifee and a modification relation. When the result of the syntactic and semantic analysis shown in FIG. 4 is expressed in a tree structure as the c-structure, structure shown in FIG. 5 is obtained. It is noted that a "modifier" indicates a component that modifies a modifee, and that a "modifiee" indicates a component, which is modified by a modifier.

The analysis result is as follows:

A modifier "YOMIURI Land" involves "located" as a modifiee and the modification relation therebetween is LOCATION;

a modifier "located" involves "roller coaster" as a modifiee and the modification relation therebetween is ADJUNCT;

a modifier "wooden" involves "roller coaster" as a modifiee and the modification relation therebetween is ADJUNCT;

a modifier "roller coaster" involves 'compula' as a modifiee, and the modification relation therebetween is SUBJECT;

a modifier 'interrogative pronoun' involves 'copula' as a modifiee and the modification relation therebetween is COMPLEMENT.

The term 'copula' includes words of "is" and "are".

The syntactic and semantic analysis unit 202 shown in FIG. 2 executes a syntactic and semantic analysis of an input question, and generates the result of the syntactic and semantic analysis as shown in FIG. 4.

[Question Dividing Unit]

Next, a process executed by the question dividing unit 203 will be discussed. The question dividing unit 203 is input to the result of the syntactic and semantic analysis generated by the syntactic and semantic analysis unit 202 based on the input question, and executes a question dividing process based on the result of the syntactic and semantic analysis.

An example of question sentence dividing rule is as follows:

[Question Dividing Rule a]

When complement of 'copula' ("is" and "are") is 'interrogative pronoun,' if the SUBJECT element of the 'copula' is modified by two or more arbitrary modification elements, the question sentence is divided into a plurality of question sentences each having only one modification element.

For example, when the dividing rule is applied to the result of the analysis shown in FIG. 4 corresponding to (Input Question)

"What is the wooden roller coaster located in YOMIURI Land?", the following two sub-questions are generated:

(Sub-Question 1)

"What is the roller coaster located in YOMIURI Land?"

(Sub-Question 2)

"What is the wooden roller coaster?"

The correspondence relation between the input question and the sub-questions in the tree structure shown as the c-structure will be discussed with reference to FIG. 6.

The c-structure for (Input Question)

Figure 6:
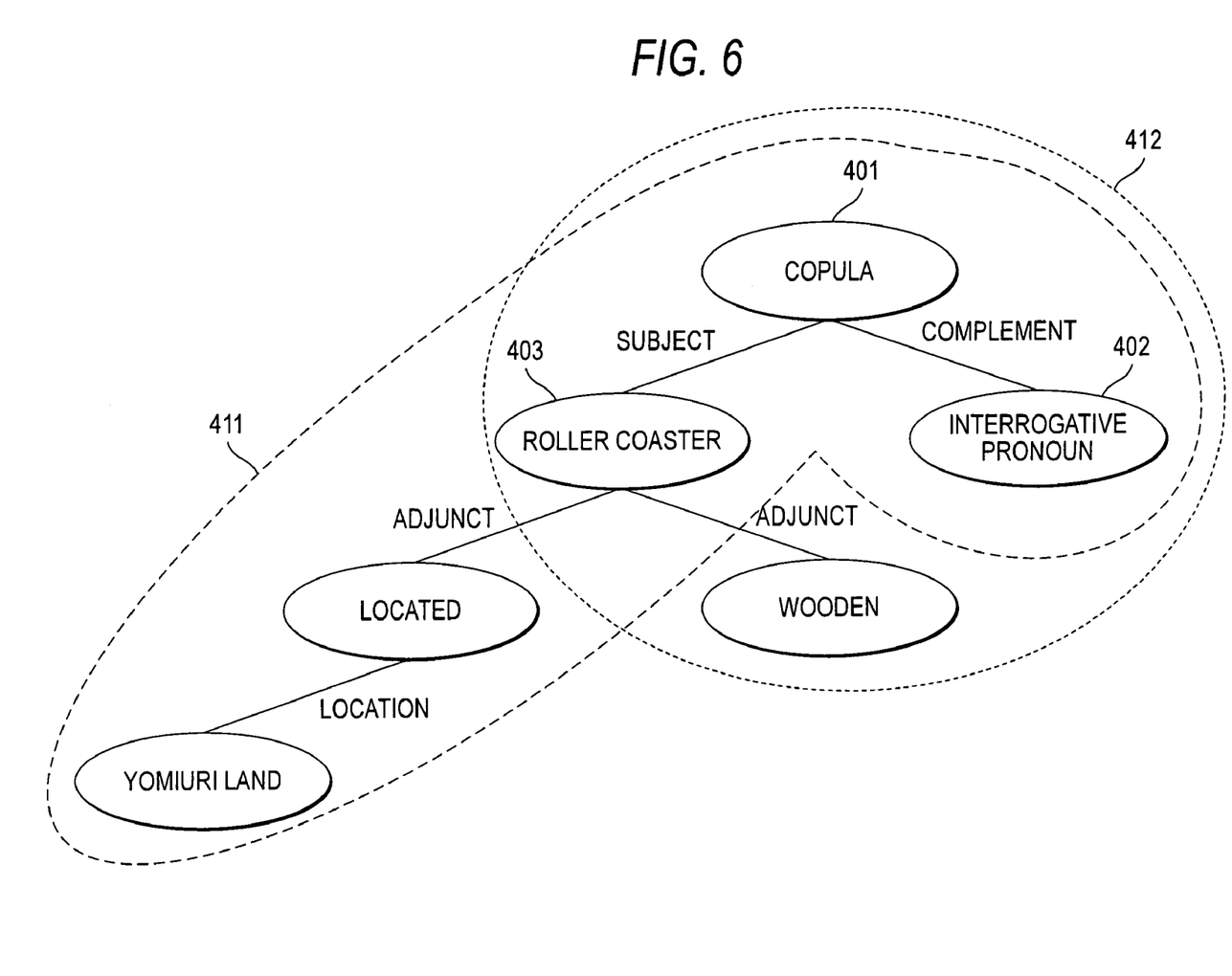
FIG. 6 is a drawing to describe generation process of sub-questions by dividing a question based on the result of the syntactic and semantic analysis.

"What is the wooden roller coaster located in YOMIURI Land?"

is the whole structure shown in FIG. 6. The above-mentioned dividing rule, that is,

[Question Dividing Rule a]

When complement of 'copula' ("is" and "are") is 'interrogative pronoun,' if the SUBJECT element of the 'copula' is modified by two or more arbitrary modification elements, the question sentence is divided into a plurality of question sentences each having only one modification element.

is applied to the input question to divide the input question.

In the structure shown in FIG. 6, 'copula' ("is," "are," etc.) is [copula] 401 and its complement is [interrogative pronoun] 402. The SUBJECT element of [copula] 401 is [roller coaster] 403.

Further, the SUBJECT element [roller coaster] 403 is modified by the two modification elements modification element 1: [YOMIURI Land]+[located]

modification element 2: [wooden]

When each of the two modification elements is selected and a question is generated, the input question is divided into two questions:

(Sub-Question 1)

"What is the roller coaster located in YOMIURI Land?"

(Sub-Question 2)

"What is the wooden roller coaster?"

The c-structures of the two sub-questions are a partial tree structure 411 and a partial tree structure 412 shown in FIG. 6.

Thus, the question dividing unit 203 is input to the result of the syntactic and semantic analysis generated by the syntactic and semantic analysis unit 202 based on the input question, and executes the question dividing process based on the result of the syntactic and semantic analysis. It is noted that the [question dividing rule a], which is described above as the question dividing rule, is shown by way of example, and that any other rule may be applied.

[Question Answering Unit]

Next, a process executed by the question answering unit 204 will be discussed. The question answering unit 204 an uses already existing question answering system to acquire answer candidates based on the sub-questions generated by the question dividing unit 203. For example, the question answering system proposed by "JP 2002-132811 A" may be used to acquire answer candidates for a plurality of sub-questions. That is, for example, a search process, which is based on text pattern matching and uses the Web pages provided by the Web page providing server connected to the network serving as information sources, is executed for acquiring the answer candidates corresponding to each sub-question.

For example, an answer acquisition process based on the question answering system is executed for each of the two sub-questions:

(Sub-Question 1)

"What is the roller coaster located in YOMIURI Land?"

(Sub-Question 2)

"What is the wooden roller coaster?"

corresponding to (Input Question)

"What is the wooden roller coaster located in YOMIURI Land?", to acquire the answer candidates corresponding to each sub-question. It is assumed that a certainty value is assigned to each answer candidate. The certainty values correspond to reliability indexes indicating reliability as an answer. The certainty value is based on consistency with a question type; for example, for a question of "who is," "person" is an answer with high reliability and the certainty value is set high. For a question of "where is," the certainty value for an answer of "place name" is set high. If the frequency of appearance is high, the certainty value is set high. A certainty value setting algorithm depends on the question answering system to be used; the configuration wherein the certainty value of an answer with higher reliability is set higher is common.

The question answering unit 204 acquires a group of answers to each sub-question together with the certainty values, such as answers corresponding to sub-question a:

[answer A: Certainty value=0.90], [answer B: Certainty value=0.62], [answer C: Certainty value=0.30] . . .

answers corresponding to sub-question b:

[answer P: Certainty value=0.80], [answer Q: Certainty value=0.55], [answer R: Certainty value=0.27] . . .

, to output the answers to the answer determination unit 205.

[Answer Determination Unit]

Next, a process executed by the answer determination unit 205 will be discussed. The answer determination unit 205 selects an answer having the largest sum of certainty values from among the answer candidates acquired for the plurality of sub-questions, as the answer to the input question. Alternatively, the answer determination unit 205 may select an answer having the largest sum of certainty values from among answer candidates appearing in common in the answer candidates acquired for the plurality of sub-questions, as the answer to the input question.

For example, it is assumed that
"Bandit (0.95),"
"White Canyon (0.95)," and
"Elf (0.21)
are obtained as
"answers (certainty values)" to
(Sub-Question 1)
"What is the roller coaster located in YOMIURI Land?", which is a sub-question of
(Input Question)
"What is the wooden roller coaster located in YOMIURI Land?".

On the other hand, it is assumed that
"ASKA (0.90),"
"Jupiter (0.90),"
"Elf (0.90),"
"Regina (0.90),"
"White Canyon (0.90)," and
"White Cyclone (0.90)"

are obtained as
"answers (certainty values)" to
(Sub-Question 2)
"What is the wooden roller coaster?", which is a sub-question of
(Input Question)
"What is the wooden roller coaster located in YOMIURI Land?"

Figure 7:
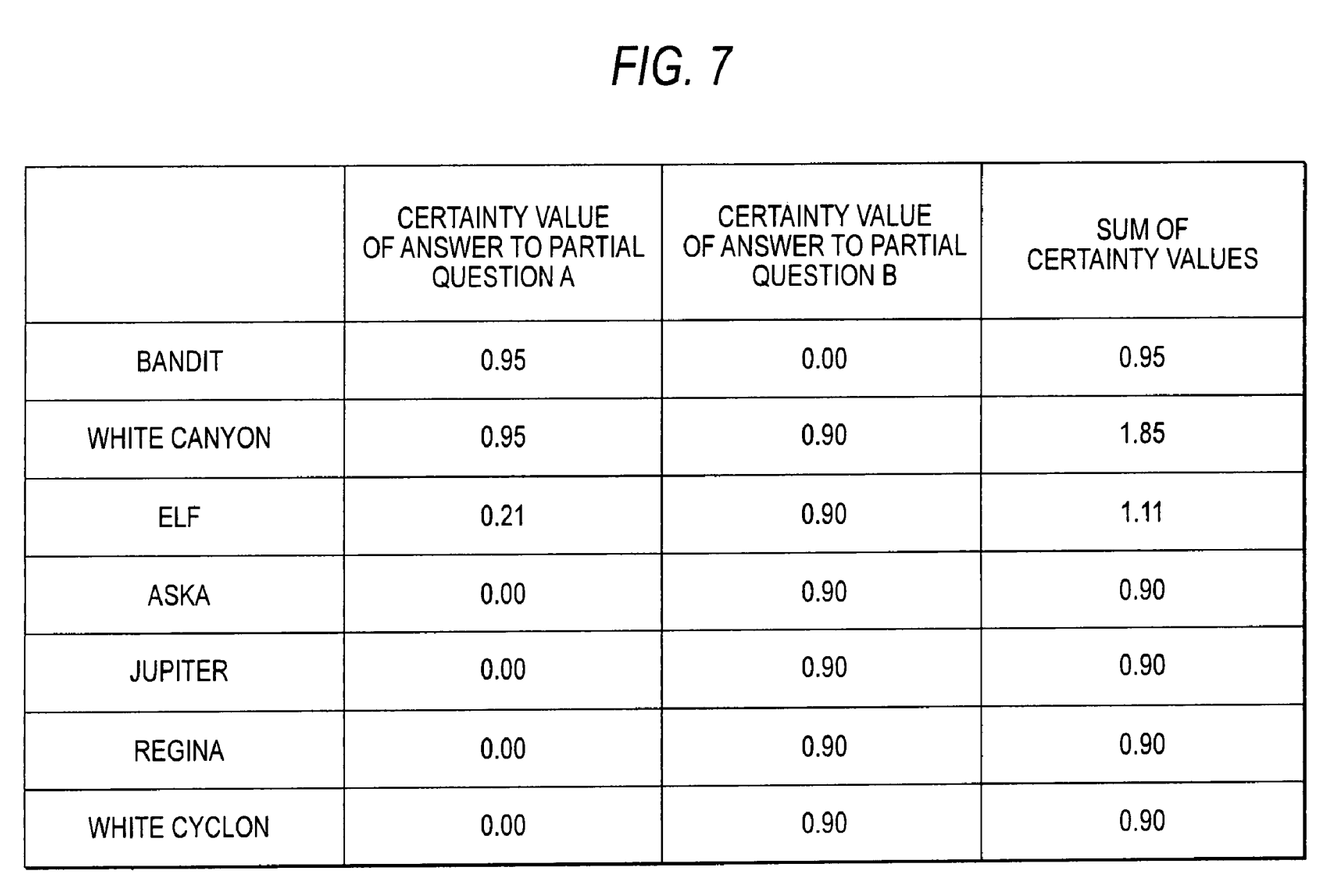
FIG. 7 is a drawing to describe a list of answers to sub-question and certainty values and answer determination process executed by answer determination unit.

FIG. 7 shows these results. The answer determination unit 205 selects the answer with the largest sum of the certainty values as the answer to the input question. Alternatively, the answer determination unit 205 may select an answer having the largest sum of certainty values from among answer candidates appearing in common in the answer candidates acquired for the sub-questions, as the answer to the input question.

In this example, it is assumed that an answer, which appears in common in the answers to the sub-questions and has the largest sum of certainty values, is selected as the answer to the input question. In this case, the answer, appears in common in the answers to the sub-questions and has the largest sum of certainty values, is "White Canyon". Therefore, "White Canyon" is selected as the final answer.

[Answer Output Unit]

The answer output unit 206 outputs the answer determined by the answer determination unit 205 to the client. The answer selected based on the certainty value in the answer determination unit 205 is output to the client.

Next, the process sequence executed by the question answering system of this embodiment will be discussed with reference to FIG. 8.

When a question from a client is input at step S101, the syntactic and semantic analysis process based on the question from the client is executed at step 5102. The syntactic and semantic analysis unit 202 shown in FIG. 2 executes this process.

Specifically, if the question is
(Input Question)
"What is the wooden roller coaster located in YOMIURI Land?", the result of the syntactic and semantic analysis shown in FIG. 4 is generated.

Next, at step S103, the question dividing rule is applied to the result of the syntactic and semantic analysis of the input question to generate sub-questions. The question dividing unit 203 shown in FIG. 2 executes this process as described above. The following predetermined question dividing rules are applied to the input question to execute the process of dividing the input question and generate the sub-questions. The question dividing process is executed for generating sub-questions by applying the preset question dividing rules:

[Question Dividing Rule a]

When complement of 'copula' ("is" and "are") is 'interrogative pronoun,' if the SUBJECT element of the 'copula' is modified by two or more arbitrary modification elements, the question sentence is divided into a plurality of question sentences each having only one modification element.

Specifically, the following two sub-questions corresponding to
(Input Question)
"What is the wooden roller coaster located in YOMIURI Land?"

are generated:
(Sub-Question 1)
"What is the roller coaster located in YOMIURI Land?"
(Sub-Question 2)
"What is the wooden roller coaster?"

Next, at step S104, an already existing question answering system is used to acquire answer candidates based on the sub-questions generated by the question dividing unit 203. The question answering unit 204 shown in FIG. 2 executes this process. A search process based on text matching using the Web pages provided by the Web page providing server connected to the network is executed for acquiring the answer candidates together with the certainty values. For example, the answer candidates shown in FIG. 7 are obtained.

At step S105, an output answer is selected on the basis of the certainty values of the answer candidates. The answer determination unit 205 shown in FIG. 2 executes this process. The answer determination unit 205 selects the answer having the largest sum of the certainty values, as the answer to the input question. Alternatively, the answer determination unit 205 may select an answer having the largest sum of certainty values from among answer candidates appearing in common in the answer candidates acquired for the sub-questions, as the answer to the input question.

At step S106, the answer found at step S105 is output to the client through the answer output unit 206.

As the result of these processes, for example, "White Canyon" is finally selected as an answer to
(Input Question)
"What is the wooden roller coaster located in YOMIURI Land?"

and is presented to the client.

OTHER EMBODIMENTS

Examples different from the above-described embodiment will be discussed.

(a) Modified Example 1

In the above embodiment, the question dividing unit 203 is input to the result of the syntactic and semantic analysis generated by the syntactic and semantic analysis unit 202 based on the input question, and applies the predetermined question dividing rule to execute the question dividing process, by way of example.

Further, the question dividing unit 203 may apply a search pattern generation rule described below to the result of the syntactic and semantic analysis to generate a search pattern, and execute a character-string search for the input question based on the generated search pattern to divide the input question.

[Search Pattern Generation Rule]

When complement of 'copula' ("is" and "are") is 'interrogative pronoun', if a SUBJECT element of the 'copula' is modified by two or more arbitrary modification elements, the input question is divided into a plurality of search patterns each including only one modification element. However, if the SUBJECT element is modified with a relation of ADJUNCT (adjective), the following search patterns are generated:

"[*] is ADJUNCT (adjective) SUBJ."

If the SUBJECT element is modified with a relation of ADJUNCT (post participle), the following search patterns are generated:

"[*] is SUBJ that is ADJUNCT (past participle)."

A specific example will be discussed. For example, if the input question is

"What is the wooden roller coaster located in YOMIURI Land?"

the two types of search patterns are generated:

"[*] is a wooden roller coaster"

and

"[*] is a roller coaster located in YOMIURI Land."

These search patterns are presented to the question answering unit 204. Then the question answering unit 204 executes a search process on the basis of these search patterns. The character strings, which match [*] and are obtained as the result of the search process, are adopted as answer candidates. Here, the certainty value "1" is assigned to all answer candidates.

Since the search is made using the search patterns, it is made possible to replace the question answering unit with a unit for making a search on the basis of pattern matching, and general versatility is enhanced.

(b) Modified Example 2

The description of the above embodiment is premised on that answer candidates are obtained by performing the search process based on the sub-questions generated by the question answering unit 204. However, the answer candidates are not always acquired. Alternatively, only answer candidates having low certainty values may be acquired.

In such a case, the question dividing unit 203 references the result of the answer candidates acquired by the question answering unit 204. If an answer candidate having a certainty value exceeding a given threshold value is not found, the question dividing unit 203 further divides the question sentence.

For example, the question dividing unit 203 applies the following search pattern re-dividing rule to re-divide the input question:

[Re-Dividing Rule]

When complement of 'copula' ("is" and "are") is 'interrogative pronoun', if a SUBJECT element of the 'copula' is modified by two or more arbitrary modification elements, the input question is divided into a plurality of search patterns each having only one modification element. However, if the SUBJECT element is modified with a relation of ADJUNCT (adjective), the following search patterns are generated:

"[*] is ADJUNCT (adjective) SUBJ."

If the search result is not obtained, the following search patterns are generated:

"[*] is SUBJ"

and

"[*] is ADJUNCT (adjective)."

If the search result is not obtained using the above-described search pattern, that is, "[*] is a wooden roller coaster", new search patterns, namely, the following two types of search patterns are further generated:

"[*] is a roller coaster"

and

"[*] is wooden", the character strings matching [*] are adopted as answer candidates.

Since the sub-question condition is re-divided, the possibility that answer candidates will be obtained is increased and a highly reliable answer having the high certainty value can be acquired.

(c) Modified Example 3

In the above embodiment, the answer determination unit 205 selects the answer having the largest sum of certainty values from among the answer candidates appearing in common in the answer candidates to the sub-questions, as the answer to the question from the client.

The answer determination unit 205 may use any other answer selection algorithm rather than such answer determination process depending on the certainty value. For example, a rule of replacing a part of another sub-question (sub-question B) with an answer to one sub-question (sub-question A) is retained and the final answer is obtained according to the resultant sub-question B.

A specific example will be discussed. It is assumed that the question dividing unit 203 has the following question dividing rule:

[Question Dividing Rule]

When complement of 'copula' ("is" and "are") is 'interrogative pronoun', if a SUBJECT element of the 'copula' is modified by ADJUNCT (relative clause) and the SUBJECT element or an OBJECT element (element 1) in the relative clause is further modified by an adjunct modification element (element 2), "what is" and 'interrogative pronoun' is added to a character string corresponding to element 2+element 1 to generate a first sub-question. A question sentence from which element 2 is deleted is adopted as a second sub-question. This question dividing rule is premised on that element 1 is a common noun (not a proper noun).

According to the question dividing rule, for example, for
(Input Question)
"Who is the director of the movie earning the largest box-office sales in 2004?"
Element 1:
"movie"
Element 2:
"earning the largest box-office sales in 2004"

are obtained and the following sub-questions are obtained:

(Sub-Question 1)

"What is the movie earning the largest box-office sales in 2004?"

(Sub-Question 2)

"Who is the director of the movie?"

Further, the answer determination unit 205 replaces the element 1 of the sub-question 2 with an answer candidate acquired for the sub-question 1.

For example, if "Spirited Away" is included in answers obtained from (Sub-Question 1)

"What is the movie earning the largest box-office sales in 2004?"

element 1 "movie" of (Sub-Question 2)

"Who is the director of the movie?"

is replaced with the answer to sub-question 1, "Spirited Away", to generate a transformational sub-question 2 with sub-question 2 transformed. Consequently, the following transformational sub-question 2 is generated:

(Transformational Sub-Question 2)

"Who is the director of Spirited Away?"

The question answering unit 204 executes a search process of finding an answer based on this transformational sub-question to obtain an answer to transformational sub-question 2.

The element of the question sentence of the sub-question 2 may be replaced only when the certainty value of the answer obtained from sub-question 1 is larger than a preset threshold value. Alternatively, a method of outputting a plurality of answer candidates to the question sentence of sub-question 1 and requesting a user to select the correct answer may be adopted.

Last, a hardware configuration example of an information process apparatus implementing the question answering system for executing the process described above will be discussed with reference to FIG. 9. A CPU (Central Process Unit) 501 executes a process corresponding to an OS (Operating System) and executes the syntactic and semantic analysis process, the question dividing process, the question answering process, the answer determination process, etc., based on an input question as described above in the embodiment. The CPU 501 executes the process in accordance with a computer program stored in a data storage section of ROM, a hard disk, etc., of each information process apparatus.

Figure 9:
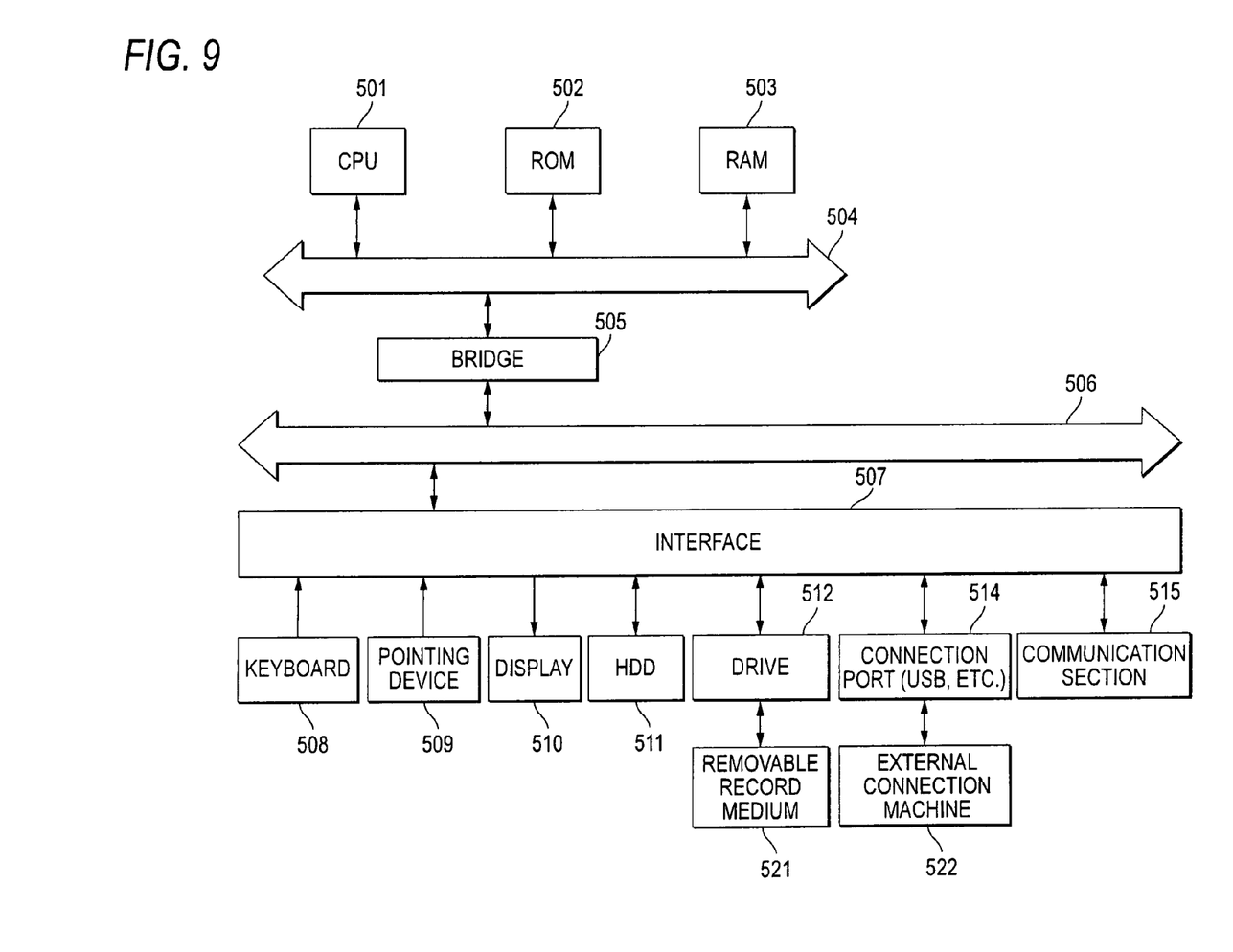
FIG. 9 is a diagram to describe a hardware configuration example of the question answering system according to the embodiment of the invention.

ROM (Read-Only Memory) 502 stores the program, operation parameters, etc., used by the CPU 501. RAM (Random Access Memory) 503 stores a program used in execution of the CPU 501, parameters, etc., changed whenever necessary in the execution of the CPU 501. They are connected by a host bus 504 implemented as a CPU bus, etc.

The host bus 504 is connected to an external bus 506 of a PCI (Peripheral Component Interconnect/Interface) bus, etc., via a bridge 505.

A keyboard 508 and a pointing device 509 are input devices operated by the user. A display 510 is implemented as a liquid crystal display, a CRT (cathode ray tube), or the like for displaying various pieces of information as text or an image.

An HDD (Hard Disk Drive) 511 contains a hard disk and drives the hard disk for recording or reproducing (playing back) a program executed by the CPU 501 and information. The hard disk is used as a storage unit for storing the question dividing rules, the results of the syntactic and semantic analysis, and/or the answer candidates, and further stores various computer programs such as a data process program.

A drive 512 reads data or a program recorded on a removable record medium 521 such as a magnetic disk, an optical disk, a magneto-optical disk, or semiconductor memory mounted, and supplies the data or the program to the RAM 503 connected via the interface 507, the external bus 506, the bridge 505, and the host bus 504.

A connection port 514 is a port for connecting an external connection machine 522 and has a connection section of USB, IEEE 1394, etc. The connection port 514 is connected to the CPU 501, etc., via the interface 507, the external bus 506, the bridge 505, the host bus 504, etc. A communication section 515 is connected to a network for executing communications with a client and a network connection server.

The hardware configuration example of the information process apparatus applied as the question answering system shown in FIG. 9 is an example of an apparatus incorporating a PC and the question answering system of the invention is not limited to the configuration shown in FIG. 9 and may have any configuration if the configuration has the capability of executing the process described above in the embodiment.

While the invention has been described in detail in its preferred embodiment, it is to be understood that modifications will be apparent to those skilled in the art without departing from the spirit and the scope of the invention. That is, the invention is disclosed for illustrative purposes only and it is to be understood that the invention is not limited to the specific embodiments thereof. When determining the scope of the invention, the following claims should be referred.

The process sequence described in the specification can be executed by both or either of hardware and software. To execute software process, the program recording the process sequence can be installed in memory in a computer incorporated in dedicated hardware for execution or can be installed in a general-purpose computer that can execute various types of process for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of process described in the specification may be executed not only in time sequence according to the description, but also in parallel or individually in response to the process capability of the apparatus for executing the process or as required. The system in the specification is a logical set made up of a plurality of units (apparatus) and is not limited to a set of units (apparatus) housed in a single cabinet.

As described above, the configuration according to the embodiments executes a syntactic and semantic analysis process on an input question; applies a predetermined question dividing rule to a result of the syntactic and semantic analysis of the input question generated by the syntactic and semantic analysis unit, to divide the input question into a plurality of sub-questions; acquires answer candidates corresponding to the plurality of sub-questions generated by the question dividing unit, together with certainty values serving as reliability indexes; and selects an answer to the input question from among the answer candidates acquired by the question answering unit. Therefore, if the input question is a long sentence, it is made possible to provide an optimum answer.

According to the configuration of one example of the invention, an overlap answer of the answers to a sub-question is preferentially selected from among the answer candidates acquired for the sub-questions. Therefore, it is made possible to select a more appropriate answer as the answer to the original question of the user.

Figure 8:
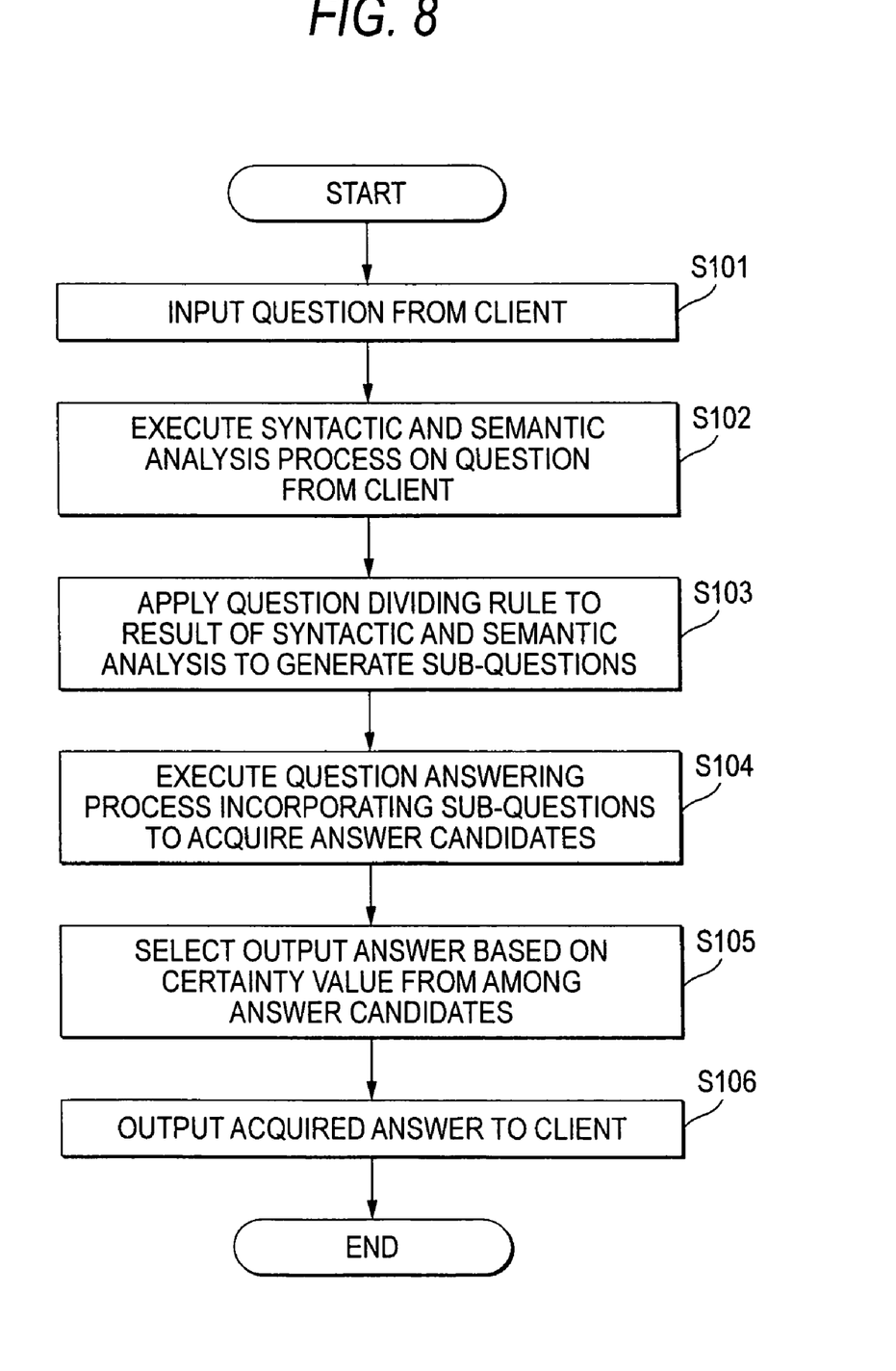
FIG. 8 is a flowchart to describe the process sequence executed by the question answering system according to the embodiment of the invention.

FIG. 1
100 NETWORK
102A WEB PAGE PROVIDING SERVER A
102B WEB PAGE PROVIDING SERVER B
102N WEB PAGE PROVIDING SERVER N
200 QUESTION ANSWERING SYSTEM
FIG. 2
200 QUESTION ANSWERING SYSTEM
201 QUESTION INPUT UNIT
202 SYNTACTIC AND SEMANTIC ANALYSIS UNIT
203 QUESTION DIVIDING UNIT
204 QUESTION ANSWERING UNIT
205 ANSWER DETERMINATION UNIT
206 ANSWER OUTPUT UNIT
FIG. 3
302 MORPHOLOGICAL ANALYSIS SECTION
302A MORPHEME RULE
302B MORPHEME DICTIONARY
303 SYNTACTIC AND SEMANTIC ANALYSIS SECTION
303A GRAMMAR RULE
303B VALENCE DICTIONARY
FIG. 8
S101 INPUT QUESTION FROM CLIENT
S102 EXECUTE SYNTACTIC AND SEMANTIC ANALYSIS PROCESS ON QUESTION FROM CLIENT
S103 APPLY QUESTION DIVIDING RULE TO RESULT OF SYNTACTIC AND SEMANTIC ANALYSIS TO GENERATE SUB-QUESTIONS
S104 EXECUTE QUESTION ANSWERING PROCESS INCORPORATING SUB-QUESTIONS TO ACQUIRE ANSWER CANDIDATES
S105 SELECT OUTPUT ANSWER BASED ON CERTAINTY VALUE FROM AMONG ANSWER CANDIDATES
S106 OUTPUT ACQUIRED ANSWER TO CLIENT
FIG. 9
505 BRIDGE
507 INTERFACE
508 KEYBOARD
509 POINTING DEVICE
510 DISPLAY
512 DRIVE
514 CONNECTION PORT (USB, ETC.)
515 COMMUNICATION SECTION
521 REMOVABLE RECORD MEDIUM
522 EXTERNAL CONNECTION MACHINE

What is claimed is:

1. A question answering system having a processor, comprising:
    a question dividing unit that applies a predetermined question dividing rule to an input question, to divide the input question into sub-questions;
    a question answering unit that acquires a plurality of answer candidates corresponding to each sub-question generated by the question dividing unit, and acquires certainty values of each answer candidate corresponding to each sub-question generated by the question dividing unit, the certainty values of the answer candidates serving as reliability indexes; and
    an answer determination unit that identifies common answer candidates provided by the question answering unit, calculates a sum of the certainly values corresponding to each common answer candidate, and selects one answer candidate having the largest sum of the certainty values from among the plurality of answer candidates acquired for the sub-questions, as an answer to the input question, wherein
    the processor controls the question dividing unit, the question answering unit, and the answer determination unit, and
    the question dividing unit references the answer candidates acquired by the question answering unit, and further divides the input question if no answer candidate having a certainty value exceeding a given threshold value is found.

2. The question answering system according to claim 1, further comprising a syntactic and semantic analysis unit that execute a syntactic and semantic analysis process on the input question,
    wherein the question dividing unit applies the predetermined question dividing rule to a result of the syntactic and semantic analysis of the input question generated by the syntactic and semantic analysis unit.

3. The question answering system according to claim 1, wherein the answer determination unit selects an answer candidate having the largest sum of the certainty values as the answer to the input question from among answer candidates commonly appearing in the answer candidates acquired for the sub-questions.

4. The question answering system according to claim 1, wherein:
    the question dividing unit applies the predetermined question dividing rule to the result of the syntactic and semantic analysis of the input question to divide the sub-questions into a plurality of search patterns, and
    the question answering unit executes a search process based on the plurality of search patterns.

5. The question answering system according to claim 1, further comprising:
    a unit that replaces an element of another sub-question with an answer candidate acquired for one sub-question of the sub-questions generated by the question dividing unit, to generate a transformational sub-question, the unit acquiring an answer to the transformational sub-question.

6. A question answering system according to claim 1, wherein the certainty values are based on consistency with a question type.

7. A data search method comprising:
    applying a predetermined question dividing rule to an input question, to divide the input question into sub-questions;
    acquiring a plurality of answer candidates corresponding to each sub-question generated by the question dividing rule, and acquires certainty values of each answer candidate corresponding to each sub-question generated by the question dividing rule, the certainty values of the answer candidates serving as reliability indexes; and
    identifying common answer candidates, calculating a sum of the certainty values corresponding to each common answer candidate, and selecting one answer candidate having the largest sum of the certainty values from among the plurality of answer candidates acquired for the sub-questions, as an answer to the input question, wherein the acquiring comprises referencing the answer candidates acquired, and further dividing the input question if no answer candidate having a certainty value exceeding a given threshold value is found, and a processor implements the data search method.

8. The data search method according to claim 7, further comprising:

executing a syntactic and semantic analysis process on an input question;

wherein the predetermined question dividing rule is applied to a result of the syntactic and semantic analysis of the input question generated by the syntactic and semantic analysis step.

9. The method according to claim 7, wherein:

the applying comprises applying the predetermined question dividing rule to the result of the syntactic and semantic analysis of the input question to divide the input question into a plurality of search patterns, and the acquiring comprises executing a search process based on the plurality of search patterns.

10. The method according to claim 7, further comprising:

replacing an element of another sub-question with an answer candidate acquired for one sub-question of the sub-questions, to generate a transformational sub-question; and acquiring an answer to the transformational sub-question.

11. The method according to claim 7, wherein the selecting comprises selecting an answer candidate having the largest sum of the certainty values as the answer to the input question from among answer candidates commonly appearing in the answer candidates acquired for the sub-questions.

12. A data search method according to claim 7, wherein the certainty values are based on consistency with a question type.

13. A computer-readable storage medium storing a computer program stored in a computer readable storage medium, the computer program causing a computer to execute a data search process comprising:

applying a predetermined question dividing rule to an input question, to divide the input question into a plurality of sub-questions;

acquiring a plurality of answer candidates corresponding to each sub-question generated by the question dividing rule, and acquiring certainty values of each answer candidate corresponding to each sub-question generated by the question dividing rule, the certainty values of the answer candidates serving as reliability indexes; and identifying common answer candidates, calculating a sum of the certainty values corresponding to each common answer candidate, and selecting one answer candidate having the largest sum of the certainty values with respect to respective sub-questions from among the plurality of answer candidates acquired for the sub-questions, as an answer to the input question, wherein the acquiring comprises referencing the answer candidates acquired, and further dividing the input question short if no answer candidate having a certainty value exceeding a given threshold value is found.

14. A computer-readable storage medium according to claim 13, wherein the certainty values are based on consistency with a question type.

\* \* \* \* \*